Figure 1:
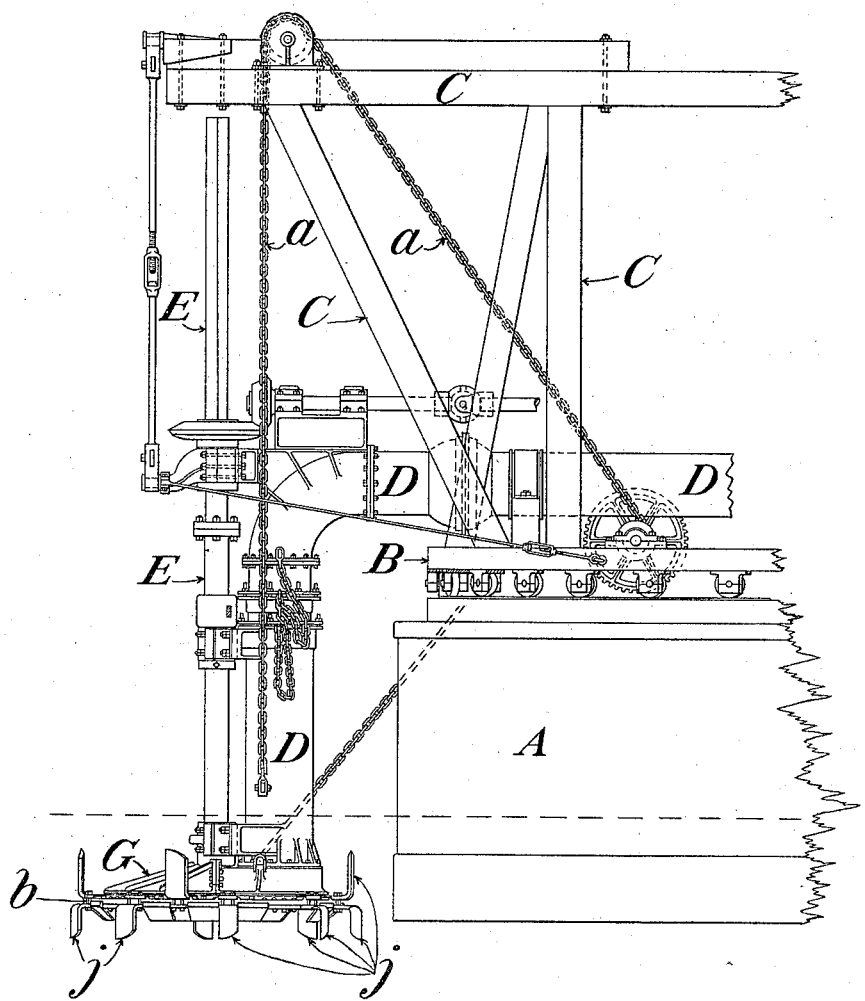

(No Model.) 6 Sheets—Sheet 1.

A. W. VON SCHMIDT.
DREDGING MACHINE.

No. 534,983. Patented Feb. 26, 1895.

Witnesses
Chester L. Angell
Frederick C. Müller

Alexey W. Von Schmidt, Inventor (No Model.)  A. W. VON SCHMIDT.  6 Sheets—Sheet 2.
DREDGING MACHINE.

No. 534,983.  Patented Feb. 26, 1895.

Witnesses  
Chester L. Angell  
Frederick C. Müller

Alexey W. Von Schmidt, Inventor (No Model.) 6 Sheets—Sheet 3.

A. W. VON SCHMIDT.
DREDGING MACHINE.

No. 534,983. Patented Feb. 26, 1895.

WITNESSES:
Edwin L. Bradford
N. Curtis Lammond

INVENTOR
Allpey W. Von Schmidt
BY
Ym. C. W. Intire
ATTORNEY.

(No Model.) 6 Sheets—Sheet 4.
A. W. VON SCHMIDT.
DREDGING MACHINE.
No. 534,983. Patented Feb. 26, 1895.
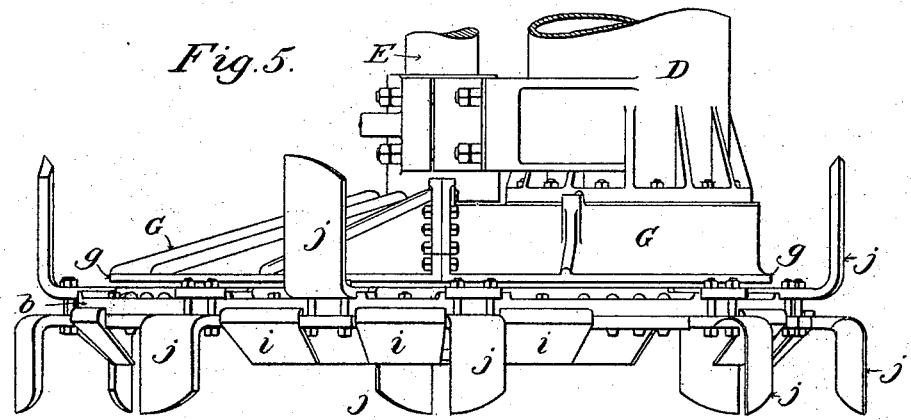
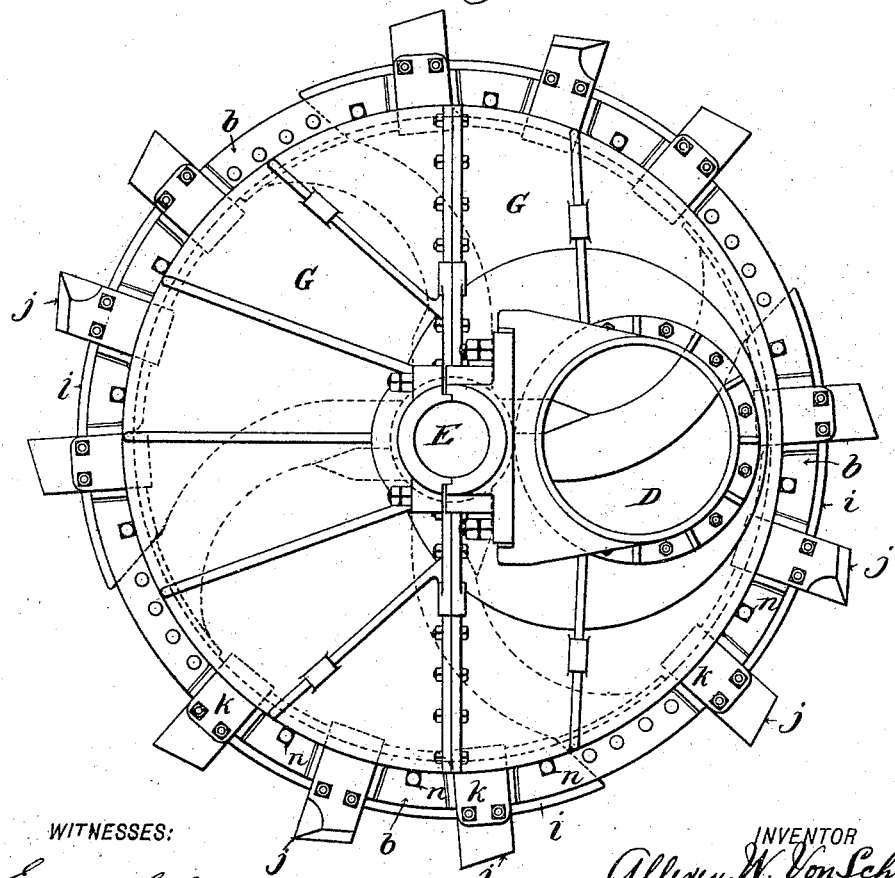

(No Model.) 6 Sheets—Sheet 5.
A. W. VON SCHMIDT.
DREDGING MACHINE.

No. 534,983. Patented Feb. 26, 1895.

Witnesses
Chester L. Angell
Frederick C. Müller

Alexey W. Von Schmidt Inventor (No Model.) 6 Sheets—Sheet 6.

A. W. VON SCHMIDT.
DREDGING MACHINE.

No. 534,983. Patented Feb. 26, 1895.

Witnesses
Chester L. Angell
Frederick C. Müller

Alexey W. Von Schmidt, Inventor

UNITED STATES PATENT OFFICE.

ALLEXEY W. VON SCHMIDT, OF SAN FRANCISCO, CALIFORNIA.

DREDGING-MACHINE.

SPECIFICATION forming part of Letters Patent No. 534,983, dated February 26, 1895.

Application filed December 7, 1894. Serial No. 531,151. (No model.)

*To all whom it may concern:*

Be it known that I, ALLEXEY W. VON SCHMIDT, a citizen of the United States, residing at San Francisco, State of California, have invented a new and useful improvement in a rotary ring to hold the knives in place with shields working under a hood for submarine work for dredging purposes, of which the following is a specification.

My invention relates to certain new and useful improvements in the rotary ring, with pockets to hold the knives in place; also in a shield of metal of a V-shape fastened under the ring, and the hood constructed to fit close to the ring; also the stock and blade of the knife made in two separate pieces.

The invention is an improvement upon the plow described in Letters Patent No. 277,171, granted me May 8, 1883, and Letters Patent No. 300,333, granted me June 10, 1884, and Letters Patent No. 306,368, granted me October 7, 1884, and is intended to be supported and operated in substantially the same manner as described in those said above patents.

In the operation of plows or knives of the character as heretofore constructed, considerable difficulty has been experienced by reason of the plows or knives slipping along the ring and bunching.

The object of the present invention is to prevent the slipping of either plows or knives on the ring.

The other object of this invention is to close a large part of the opening under the ring with a shield fastened to the ring, so as to prevent too much space for the entrance of clear water to suction pipe. The V-shaped shield projects downward and inward on an angle of about forty-five degrees (45°), causes the water to enter under the hood and go downward with great force, thereby stirring up the sand or mud in such a manner that the suction caused by the rotary pump will draw it up readily. The hood is also improved so as to fit close to the ring, excluding the water entering the suction pipe from the side between the ring and the hood.

The invention consists in a ring working under a hood, having pockets to hold the knives or plows in place, and a V-shaped shield under the ring, the ring being in the general form of that shown in the patents referred to, connected with arms to a hub and driving shaft.

In order that those skilled in the art may know how to make and use my improved ring, shield, hood and knives, I will now proceed to minutely describe the same with the accompanying drawings, in which—

Figure 2:
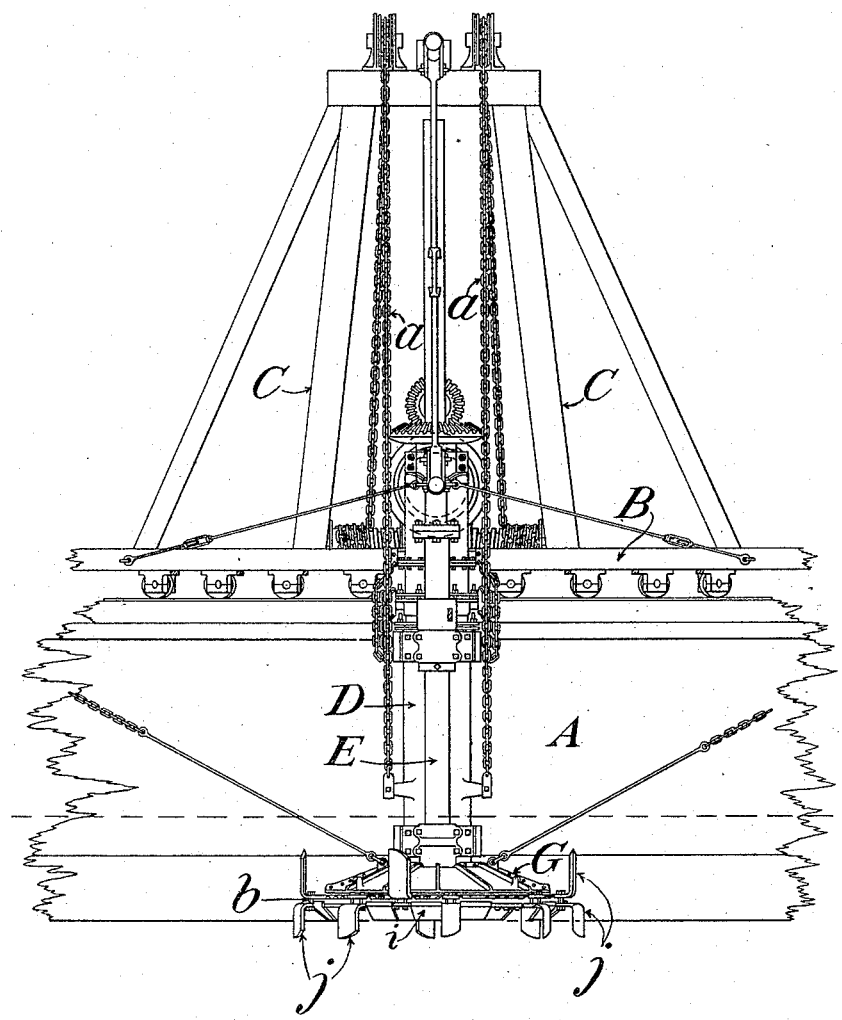
Figure 3:
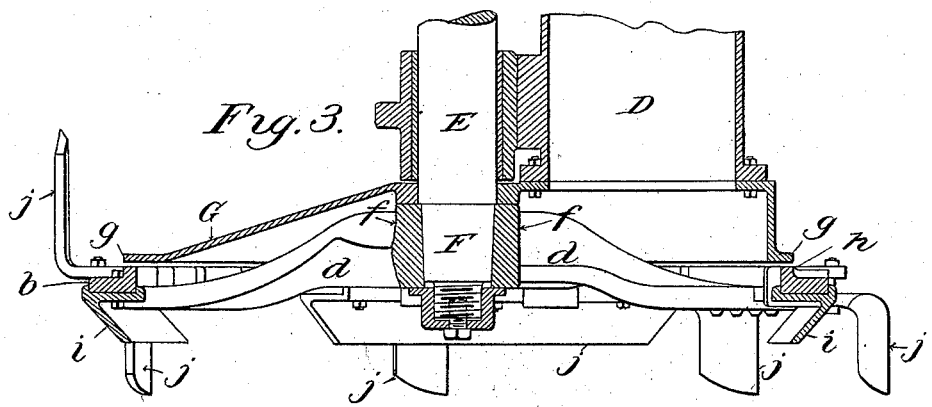
Figure 4:
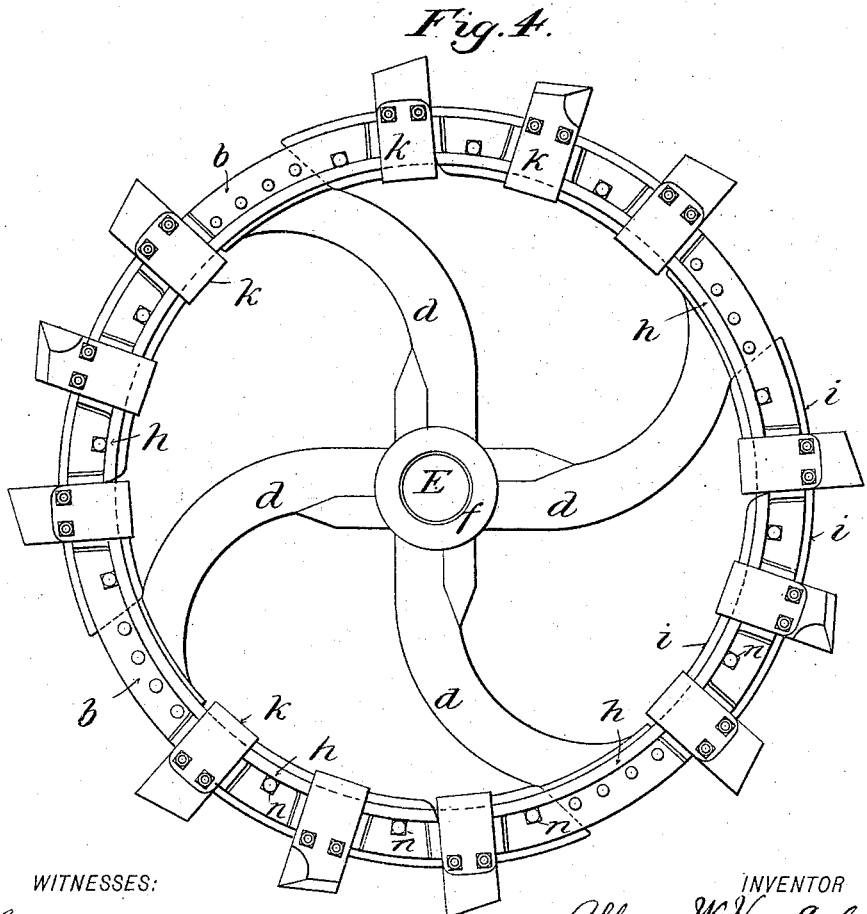
Figure 7:
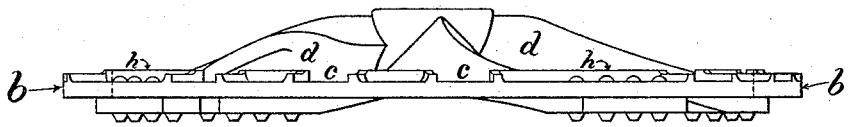
Figure 8:
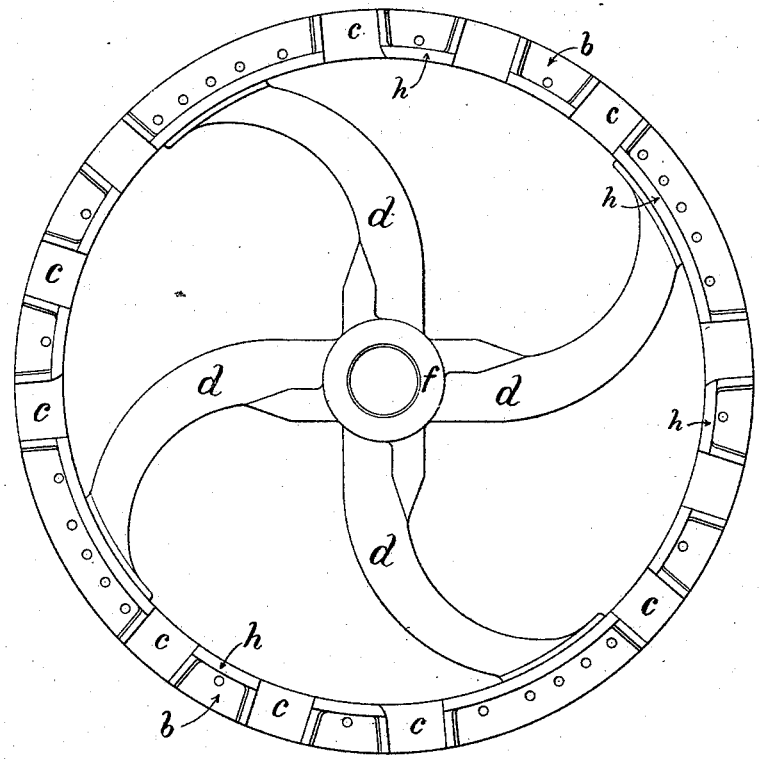
Figure 9:
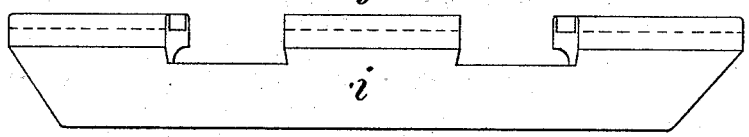
Figure 10:
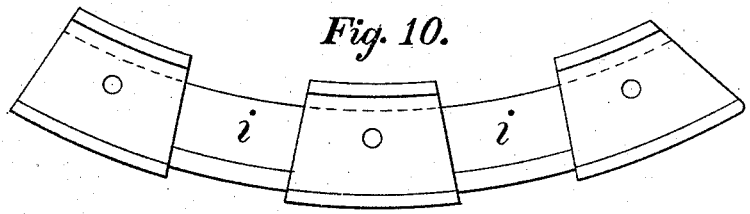
Figure 11:
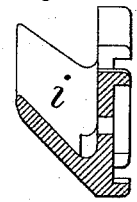
Figure 15:
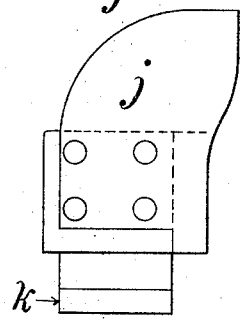
Figure 18:
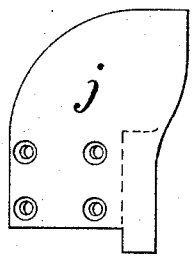
Figure 12:
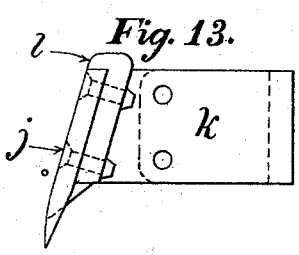
Figure 13:
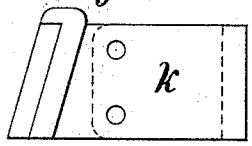
Figure 16:
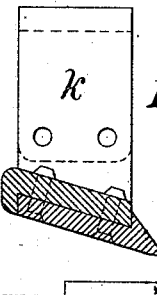
Figure 19:
Figures 14, 17:
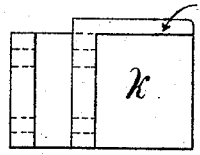

Figure 1, Sheet 1, represents a side view of the forward part of the dredge machine. Fig. 2, Sheet 2, represents a front view of the dredge machine. Fig. 3, Sheet 3, represents a cross section of the hood, suction pipe, hub, shaft, arms and ring, with knives and V shield. Fig. 4, Sheet 3, represents a top view of ring, hub, arms, knives, pockets and V shields in place. Fig. 5, Sheet 4, represents side view of the suction pipe, hood, ring, knives and V-shaped shield, in position. Fig. 6, Sheet 4, represents top view of suction pipe, hood, ring, knives, V-shaped shield, in place. Fig. 7, Sheet 5, represents a side view of hub, arms, ring, and pockets to hold the knives, in place. Fig. 8, Sheet 5, represents a top view of hub, arms, ring, and pockets to hold the knives, and turned ring to fit close to hood. Fig. 9, Sheet 6, represents side view of V-shaped shield, to cause the flow of water downward. Fig. 10, Sheet 6, represents top view of V-shaped shield, showing clamps and lugs with holes for bolts to fasten same to ring. Fig. 11, Sheet 6, represents cross section of V-shaped shield. Fig. 12, Sheet 6, represents end views of shank for knife. Fig. 13, Sheet 6, represents bottom views of knife and shank. Fig. 14, Sheet 6, represents bottom view of shank with supporting rib to hold knife. Fig. 15, Sheet 6, represents side view of shank and knife riveted together. Fig. 16, Sheet 6, represents bottom views of shank and knife riveted. Fig. 17, Sheet 6, represents side view of shank with supporting rib to hold knife. Fig. 18, Sheet 6, represents side view of knife only, and supporting rib on knife, and holes for rivets to fasten same to stock or shank. Fig. 19, Sheet 6, represents end view of knife blade with supporting rib.

Like letters represent like parts in the several figures, and reference may be made to the within mentioned patents, hereinbefore referred to, for a clear understanding of the relative position and operation of the plows or knives, as fastened on the ring, when placed in the pockets.

Figs. 1 and 2, Sheets 1 and 2, letter A represents the dredge boat, with traveling table B, frame C, suction pipe D, supporting chains ($a$), shaft E, to drive cutter ring ($b$), having pockets to hold knives in position as shown in Figs. 5 and 6, Sheet 4, and Figs. 7 and 8, Sheet 5, letter ($c$), said ring ($b$) being connected to four arms, letter ($d$), and to hub ($f$), connecting to main shaft E, as shown in Fig. 3, Sheet 3, letter F.

Figs. 5 and 6, Sheet 4, letter G represents the hood made in two parts, with a lip cast on the outer lower edge, letter ($g$), to fit close to the ring ($b$), which ring has a ring cast and turned to meet the lip on the hood, letter ($g$), on upper side of ring, as shown in Figs. 3 and 4, Sheet 3, letter ($h$), and in Figs. 7 and 8, Sheet 5.

Figs. 1, 2, 3, 4, 5, 6, 9, 10, 11, Sheets 1, 2, 3, 4 and 6, letter ($i$) represents the V-shaped shield fastened to the under side of ring ($b$) by bolts ($n$).

Figs. 12, 13, 14, 15, 16, 17, 18, 19, Sheet 6, represent the shanks, letter (K), for knives, and the knife, letter (J), separate and when riveted on for use.

Figs. 1, 2, 3, 4, 5, 6, 12, 13, 14, 15, 16, 17, 18, 19, Sheet 1, 2, 3, 4, 6, letter ($j$), represents the knives in place set on ring letter ($b$), and showing that eight of the knives are set to cut downward, and the four others are set to cut upward, working outside of hood ($c$).

Figs. 12, 13, 14, 15, 16, 17, 18, 19, Sheet 6, show the knives in all positions—shanks and knives separate from the blades or riveted to shank knives, letter ($j$) and shanks, letter (K).

The shanks K, as will be seen, are adapted to be placed upon the ring in such manner that the knives which are secured thereto may project upward or downward as may be desired. These shanks are secured in place upon the ring by suitable bolts, as clearly shown. They are provided at their outer ends with a supporting rib $l$ to brace or abut against the edge of the knife $j$, and the latter, as clearly seen at Fig. 19, has, in rear of its cutting edge, a rib or projection $m$ adapted to abut against the shank K. When the knife $j$ is secured to the shank K by suitable screw bolts, as clearly illustrated at Figs. 12, 13 and 16, it will be seen that the rib or projection $l$ on the shank braces the back edge of the plate or knife $j$, and that the rib $m$ near the cutting edge of the knife overlaps the edge of the shank K, and thus a firm connection is made between the knife and shank.

In operation the knives cut the material to be removed in a curve, as the table travels from side to side. The suction, caused by the rotary pump, causes the water from the outside of the hood to work in from all directions, the space near between the hood and ring being closed nearly, the space under the ring being closed by the shields for at least one-half of the circumference and to the depth of six inches more or less, causes the water to be directed downward with greater force, causing the sand, mud or other material to be thoroughly agitated. Suction being caused by the working of the pump, the material is drawn up the suction pipe and into the pump in a much higher percentage than can be done as heretofore operated.

In relation to the ring with pockets for holding the knives in place, it is also a great improvement for preventing them slipping on the ring and bunching; also casting shanks and knives in separate pieces and securing them with ribs, to secure the knife in place is very useful and an improvement on my former patents, as heretofore granted me. The knives can be made of any shape, according to the nature of the material to be dredged.

The object of the improvements herein made is to cut the material and use the water that enters under the hood and shields to agitate any loose material cut by the knives or loose sand to be put into active motion for the suction pipe to carry to the rotary pump.

What I claim, and desire to secure by Letters Patent of the United States, is—

1. The ring $b$ formed with the pockets $c$, for the reception of the knife blades, and circumferential ribs $h$, in combination with the hood G, substantially as and for the purpose set forth.

2. The combination with the ring ($b$), the V-shaped shield fastened to and under the ring ($b$), substantially as and for the purpose set forth.

3. In combination with the shanks K, provided with projections $l$, the knives $j$ provided with ribs $m$ in rear of the cutting edges, the shanks K and knives $j$ secured together by suitable bolts, and reciprocally bracing each other, substantially as described.

4. The combination with the ring ($b$) carrying the knives, the cutting blades set in pockets ($c$), eight cutting downward and four upward, the V-shaped shield, with close-fitting hood, substantially as described.

In testimony whereof I have hereunto set my hand in the presence of two subscribing witnesses.

ALLEXEY W. VON SCHMIDT.

Witnesses:
CHESTER L. ANGELL,
FREDERICK C. MÜLLER.